(12) United States Patent
Moloney et al.

(10) Patent No.: US 9,786,105 B2
(45) Date of Patent: Oct. 10, 2017

(54) GATHERING DATA FROM MACHINE OPERATING AT WORKSITE

(71) Applicant: Caterpillar Inc., Peoria, IL (US)

(72) Inventors: Neil J. Moloney, Peoria, IL (US);
Nicholas A. Natale, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 14 days.

(21) Appl. No.: 14/962,097

(22) Filed: Dec. 8, 2015

(65) Prior Publication Data
US 2017/0161972 A1 Jun. 8, 2017

(51) Int. Cl.
*G07C 5/08* (2006.01)
*B64C 39/02* (2006.01)
*G07C 5/00* (2006.01)
*B64D 47/08* (2006.01)

(52) U.S. Cl.
CPC .......... *G07C 5/0841* (2013.01); *B64C 39/022* (2013.01); *B64D 47/08* (2013.01); *G07C 5/008* (2013.01)

(58) Field of Classification Search
None
See application file for complete search history.

(56) References Cited

U.S. PATENT DOCUMENTS

| 3,149,803 | A | 9/1964 | Pericles et al. |
| 7,510,142 | B2 | 3/2009 | Johnson |
| 7,631,834 | B1 | 12/2009 | Johnson et al. |
| 8,948,928 | B2 | 2/2015 | Alber et al. |
| 2009/0314883 | A1 | 12/2009 | Arlton et al. |
| 2012/0303179 | A1 | 11/2012 | Schempf |
| 2013/0233964 | A1 | 9/2013 | Woodworth et al. |
| 2017/0031365 | A1* | 2/2017 | Sugumaran .......... G05D 1/0219 |

FOREIGN PATENT DOCUMENTS

| DE | 10201110617 | 2/2012 |
| FR | 2986647 | 8/2013 |
| JP | 2006180326 | 7/2006 |

OTHER PUBLICATIONS

The HoverMast Family, Sky Sapience, 1 page, downloaded from http://www.skysapience.com/products/hovermast-family, retrieved on Aug. 7, 2015.

* cited by examiner

*Primary Examiner* — Rami Khatib

(57) ABSTRACT

A data gathering system associated with a machine operating at a worksite is provided. The data gathering system includes a base station located at the worksite and an unmanned aerial device (UAD) in communication with the base station and the machine. The UAD includes an image capturing unit for capturing images of an area around the machine and a controller in communication with the image capturing unit. The controller receives a first input from the machine indicative of one or more machine parameters, and receives a second input from the image capturing unit indicative of the images of the area around the machine. The controller further determines multiple operational parameters associated with an operation of the machine based on the first input and the second input, and transmits the determined multiple operational parameters to at least one of the machine and the base station.

16 Claims, 4 Drawing Sheets

GATHERING DATA FROM MACHINE OPERATING AT WORKSITE

TECHNICAL FIELD

The present disclosure relates to a data gathering system and a method of gathering data associated with the operation of a machine operating at a worksite.

BACKGROUND

Machines, such as wheel loaders, excavators, track type tractors, on-highway trucks, and other types of machines are often equipped with sensors for determining various operating parameters of the machines. The operating parameters may include, for example, engine speed, payload, ground speed, work cycle, global position, and the like. Processors and communication devices may be provided in the machine for receiving the operating parameters, processing data associated with the operating parameters, and communicating the processed data to an off-board system for evaluation of the machine's performance. Conventionally, unmanned aerial vehicles (UAV) or unmanned aerial devices are employed to communicate with the machine for various purposes, such as surveillance. In such cases, auxiliary devices are used in addition to the UAV to gather operational parameters from the machine. As such, the additional auxiliary devices render a process of gathering and processing the operational parameters complex.

US Patent Publication Number 2013/0233964, hereinafter referred to as the '964 application, describes a tethered unmanned aerial vehicle (UAV) outfitted with a sensor payload for data gathering. The tethered UAV is tethered to a ground station for constricting the flight space of the UAV while also providing the option for power delivery and/or bidirectional communications. The tethered UAV's flight path is extended by introducing one or more secondary UAVs that cooperate to extend the horizontal flight path of a primary UAV. The ground station, which is coupled to the tethered aerial vehicle, includes a listening switch configured to determine the condition of the tether such that the supply of power to the tether is terminated when tether damage or a tether severance is detected.

SUMMARY OF THE DISCLOSURE

According to an aspect of the present disclosure, a data gathering system is described. The data gathering system is associated with a machine operating at a worksite. The data gathering system includes a base station located at the worksite and an unmanned aerial device communicatively coupled to the machine using a cable and configured to communicate with the base station. The cable is configured to receive electric power from the machine to propel the unmanned aerial device and to communicate data. The unmanned aerial device includes an image capturing unit configured to capture one or more images of an area around the machine. The unmanned aerial device also includes a controller in communication with the image capturing unit and configured to receive a first input from the machine via the cable, the first input indicative of one or more machine parameters. The controller is further configured to receive a second input from the image capturing unit, the second input indicative of one or more images of the area around the machine. The controller is further configured to determine multiple operational parameters associated with operation of the machine based on the first input and the second input. The controller is further configured to transmit the determined multiple operational parameters to at least one of the machine and the base station.

In another aspect of the present disclosure, a method for gathering data is described. The method includes receiving, by a controller of an unmanned aerial device, a first input indicative of one or more machine parameters. The unmanned aerial device is communicatively coupled to the machine via a cable. The method further includes receiving, from an image capturing unit, a second input indicative of one or more images of an area around the machine. The image capturing unit is disposed within the unmanned aerial device. The method further includes determining, by the controller, multiple operational parameters associated with the operation of the machine based on the first input and the second input. The method further includes transmitting, by the controller, the multiple operational parameters to at least one of the machine and a base station. The base station is in communication with the unmanned aerial device.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
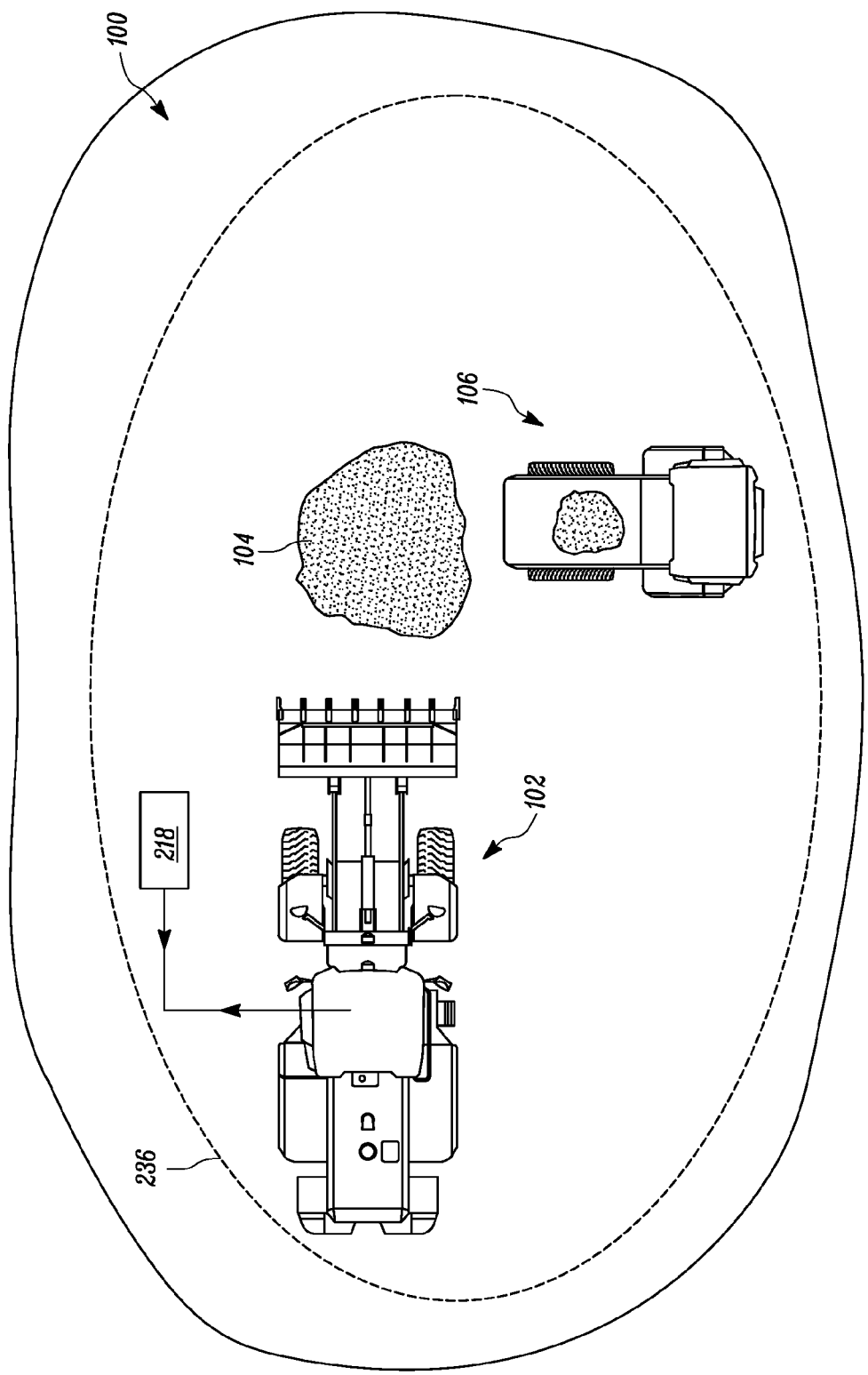
FIG. 1 is a schematic top view of a worksite and a machine operating at the worksite, according to an embodiment of the present disclosure.

FIG. 1 illustrates a schematic top view of a worksite 100 showing a machine 102 located at a position with respect to a work aggregate 104, according to an exemplary embodiment of the present disclosure. The work aggregate 104 may be understood as any material used in the worksite 100 for one or more purposes. In one example, the work aggregate 104 may include asphalt, concrete, loose aggregate materials, such as crushed gravel, or any suitable material used to construct roadways, pavements, or other surfaces. Further, the machine 102 may be heavy machinery. For example, the machine 102 may embody a mobile machine including, but not limited to, a wheel loader as depicted in the FIG. 1. The machine 102 may also include a backhoe loader, a highway haul truck, or any other type of mobile machine known in the art. The machine 102 may be used in industrial applications including, but not limited to, mining, construction, farming, transportation, or any other industrial applications known in the art.

Further, the machine 102 is configured to load the work aggregate 104 to a truck 106 which is also operating in the worksite 100 along with the machine 102. The truck 106 is embodied as a large mining truck (LMT) operating in the worksite 100. Alternatively, the truck 106 may be an off-highway truck, on-highway truck, a dump truck, an articulated truck, a loader, an excavator, a pipe layer, or a motor grader. The truck 106 may be any machine associated with various industrial applications including, but not limited to, mining, agriculture, forestry, construction, and other industrial applications.

Figure 2:
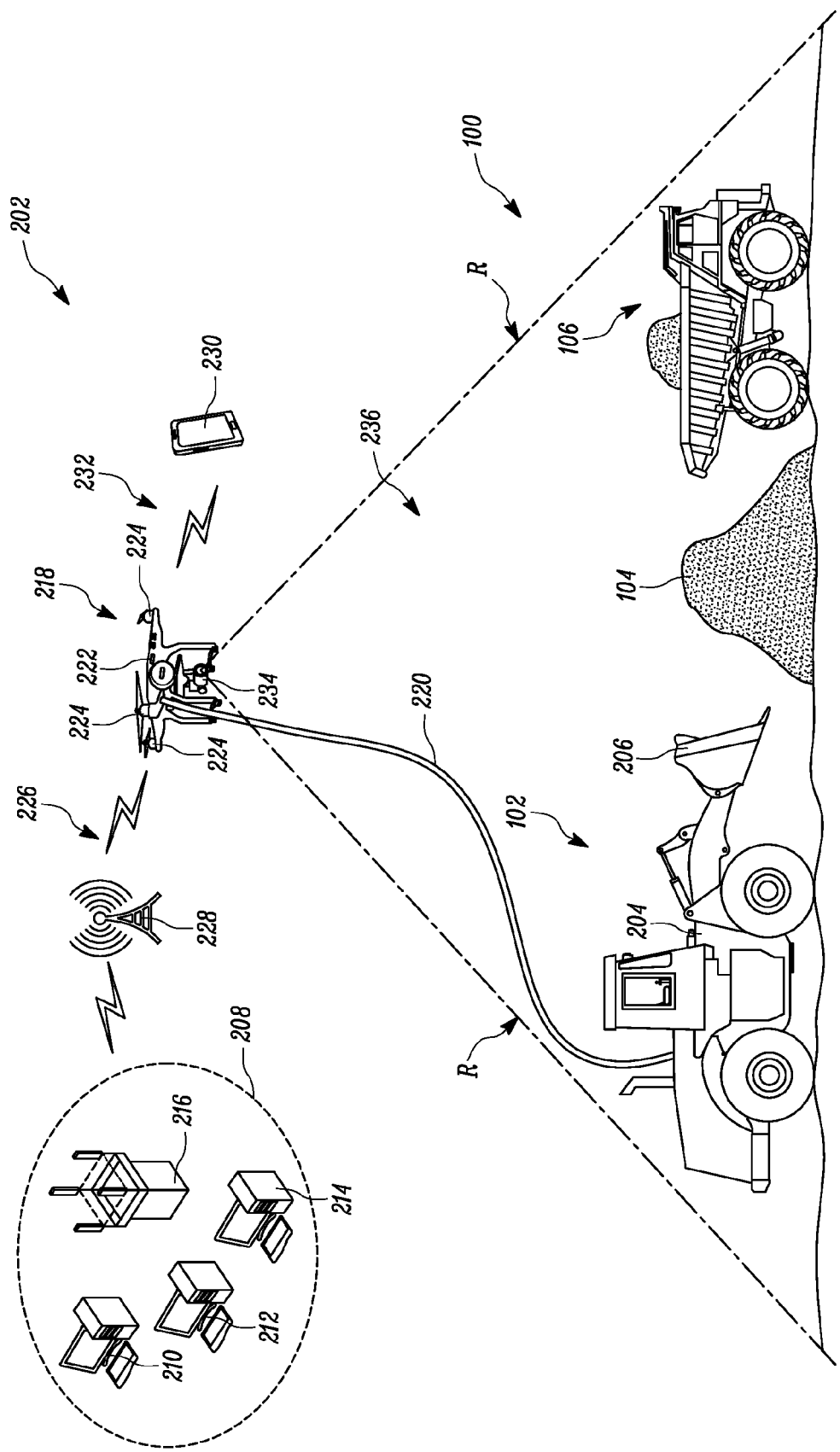
FIG. 2 is a diagrammatic representation of a data gathering system associated with the machine, according to an embodiment of the present disclosure.

FIG. 2 illustrates a diagrammatic representation of a data gathering system 202, hereinafter referred to as 'the system 202', according to an embodiment of the present disclosure. The system 202 is configured to gather data associated with the machine 102 operating at the worksite 100. As described above, from among the various operations, the machine 102 is configured to perform the operation of loading the work aggregate 104 to the truck 106. The machine 102 includes a frame 204 and an implement 206 coupled to the frame 204. The implement 206 may include a bucket, a fork arrangement, a blade, a shovel, a ripper, a dump bed, a broom, a snow blower, a propelling device, a cutting device, a grasping device, or any other task-performing device known in the art. The implement 206 may be connected to the machine 102 by a pivot member, a linkage system, and one or more hydraulic cylinders. The implement 206 may be configured to pivot, rotate, slide, swing, lift, or move relative to the frame 204 of the machine 102 in any manner known in the art. As such, the implement 206 assists the machine 102 for loading the work aggregate 104 to the truck 106.

The system 202 includes a base station 208 located at the worksite 100. The base station 208 may be understood as a central station employed at the worksite 100 to transmit and process data between two devices. For instance, the base station 208 can include a multitude of computing devices and peripherals devices, both communicatively connected to a data processing device 216. In one example, the base station 208 may include a first computing system 210, a second computing system 212, and a third computing system 214 connected to the data processing device 216. The first, second and third computing systems 210, 212, 214 may be configured to receive one or more inputs, and process the one or more inputs simultaneously. In another example, the base station 208 may include multiple base station computers, one or more base station modems, and base station software installed in the base station computers to assist in receiving and transmitting data. It will be understood that the base station 208 also include one or more trans-receivers to aid in transmitting and receiving data.

The system 202 further includes an unmanned aerial device (UAD) 218 communicatively coupled to the machine 102 using a cable 220. In an example, the unmanned aerial device 218 may be a drone. The cable 220 aids in tethering the UAD 218 with the machine 102. In accordance with an embodiment of the present disclosure, the UAD 218 is configured to rest on the machine 102 in a non-operating condition of the machine 102 and to be disposed at a height above the machine 102, as shown in FIG. 2, in an operating condition of the machine 102. Accordingly, the cable 220 is configured to receive electric power from the machine 102 to propel the UAD 218 to the height above the machine 102.

For instance, when the machine 102 is started by an operator, the electric power from the machine 102 may be supplied to the UAD 218 through the cable 220. Further, the UAD 218 may include a central structure 222 and one or more flight elements 224 attached to the central structure 222 to aid in lift of the UAD 218. As such, on receipt of the electric power from the machine 102, the one or more flight elements 224 may be operated to lift the UAD 218 from the machine 102 and dispose it at the height above the machine 102. However, when the machine 102 is actuated to the non-operating condition, that is, when the operator of the machine 102 switches off the machine 102, the flight elements 224 may assist in safe landing of the UAD 218 on the machine 102.

Further, in a powered condition of the UAD 218, the UAD 218 is configured to communicate with the base station 208 through a first network 226. The system 202 also includes a signal tower 228 to assist in transmission of signals and communication of the first network 226 between the UAD 218 and the base station 208. In one example, the first network 226 may be a wireless or a wired network, or a combination thereof. The first network 226 may be implemented by service provider systems through satellite communication, terrestrial communication, or may be implemented through use of routers and access points connected to various Digital Subscriber Line Access Multiplexers (DSLAMs) of wired networks. The first network 226 can be implemented as one of the different types of networks, such as intranet, local area network (LAN), wide area network (WAN), and the Internet. The first network 226 may either be a dedicated network or a shared network, which represents an association of different types of networks that use a variety of protocols, for example, Hypertext Transfer Protocol (HTTP), Transmission Control Protocol/Internet Protocol (TCP/IP), and Wireless Application Protocol (WAP), to communicate with each other.

In another embodiment, the UAD 218 may be configured to communicate with a mobile device 230. In an example, the mobile device 230 may be implemented as one of, but not limited to, tablet computer, phablet, mobile phone, personal digital assistance (PDA), smartphone, and the like. In one embodiment, the mobile device 230 can be a non-near field communication (non-NFC) mobile phone. Additionally, the mobile device 230 may include a processor provided to fetch and execute computer-readable instructions and/or inputs from the UAD 218. The mobile device 230 may be used by the operator of the machine 102 to receive and transmit inputs through a second network 232. The second network 232 may be similar to the first network 226 as described above.

In an embodiment, the UAD 218 further includes an image capturing unit 234 configured to capture one or more images of an area 236 around the machine 102. For instance, the image capturing unit 234 may have a visibility range "R" (indicated by dashed lines) for defining the area 236 around the machine 102, as shown in FIG. 2. In an example, the image capturing unit 234 may be embodied as a digital camera or a video camera. As such, the UAD 218 can be operated to be disposed at the height to capture the operation of the machine 102 at the worksite 100.

Figure 3:
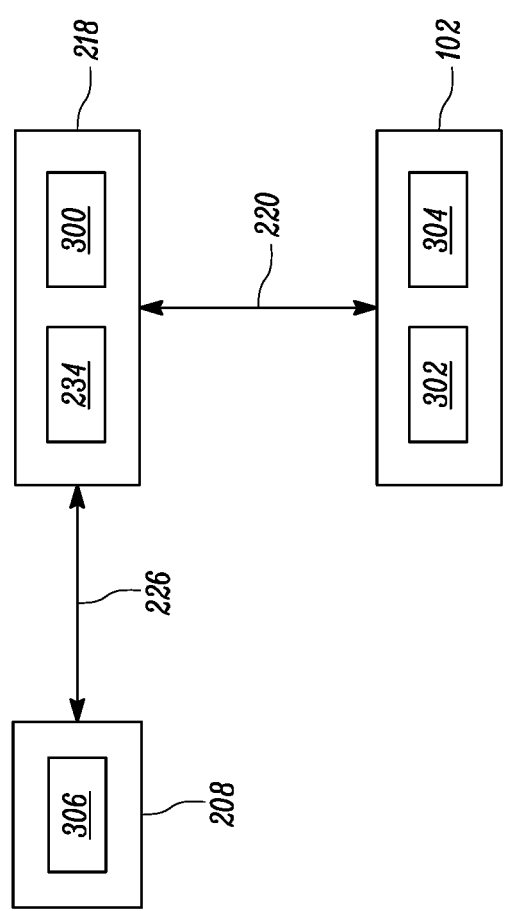
FIG. 3 is a schematic block diagram of the data gathering system, according to an embodiment of the present disclosure.

FIG. 3 illustrates a schematic block diagram of the system 202, according to an embodiment of the present disclosure. In addition to the image capturing unit 234, the UAD 218 includes a controller 300 disposed in communication with the image capturing unit 234. In an example, the controller 300 may be a processor that includes a single processing unit or a number of units, all of which include multiple computing units. The term 'processor' as used herein, should not be construed to refer exclusively to hardware capable of executing a software application. Rather, in this example, the controller 300 may be implemented as one or more microprocessors, microcomputers, digital signal processors, central processing units, state machines, logic circuitries, and/or any devices that are capable of manipulating signals based on operational instructions. Among the capabilities mentioned herein, the controller 300 may also be configured to receive, transmit, and execute computer-readable instructions.

Further, the machine 102 includes a first processing unit 302 and a sensing unit 304 disposed in communication with the first processing unit 302. In an example, the first processing unit 302 may be implemented as one or more microprocessors, microcomputers, microcontrollers, digital signal processors, central processing units, state machines, logic circuitries, and/or any devices that manipulate signals based on inputs received from the sensing unit 304. The first processing unit 302 may also include a memory to store the processed inputs. Among other capabilities, the first processing unit 302 may fetch and execute computer-readable instructions and/or applications stored in the memory. Furthermore, the sensing unit 304 is configured to generate a signal indicative of one or more machine parameters associated with the machine 102. In an example, the sensing unit 304 may include one or more sensors disposed at various locations in the machine 102 to sense any change in the one or more machine parameters.

The machine parameters, for example, may include, but are not limited to, ground speed of the machine 102, work cycle, location of the machine 102 at the worksite 100, pressure of fluid in hydraulic system of the machine 102, fuel level in the machine 102, condition of bearings and valves in the machine 102, air pressure in wheels of the machine 102, capacity and condition of bucket and accessories of the machine 102, and position of levers in the machine 102 used to operate the implement 206 of the machine 102.

Furthermore, the base station 208 includes a second processing unit 306. The second processing unit 306 may be similar to the first processing unit 302 and may include the data processing device 216 of the base station 208. In one example, the second processing unit 306 may be communicatively coupled to the data processing device 216, and each of the first, second and third computing systems 210, 212, 214 may be communicatively coupled to the data processing device 216. With such an arrangement, the second processing unit 306 may be configured to distribute and allocate any analysis and processing of data, to the first, second and third computing systems 210, 212, 214.

As described earlier, the UAD 218 is communicatively coupled to the machine 102 via the cable 220. Furthermore, the cable 220 is configured to communicate with the controller 300 and the first processing unit 302 of the machine 102. As such, the cable 220 establishes a connection between the controller 300 and the first processing unit 302. In one embodiment, the controller 300 is configured to receive a first input from the machine 102 via the cable 220 and receive a second input from the image capturing unit 234. The first input is indicative of one or more machine parameters and the second input is indicative of the one or more images of the area 236 around the machine 102. In an example, if the image capturing unit 234 is a video camera, then the controller 300 may receive a video signal as the second input from the image capturing unit 234. In such a case, the controller 300 may be configured to parse the video signal into multiple images based on a predefined frame number. Further, based on the first input and the second input, the controller 300 is configured to determine multiple operational parameters, alternatively referred to as the operational parameters in this description, associated with the machine 102. The multiple operational parameters include at least one of a position of the implement 206 of the machine 102 relative to the frame 204 thereof, a data regarding loading of the machine 102 and the truck 106, a data regarding proximity of the machine 102 to the truck 106, a bucket fill factor, and a work cycle of the machine 102.

For instance, the first input received by the controller 300 may be indicative of the capacity of bucket of the machine 102. In addition, the second input may be provided in multiple images of the machine 102 illustrating the loading operation performed by the machine 102. During the loading operation, the implement 206 of the machine 102 collects the work aggregate 104 from the worksite 100 and loads it to the truck 106. Accordingly, the controller 300 may be configured to determine, from the images, a portion of the bucket not filled with the work aggregate 104 during the loading operation. In one example, the controller 300, along with auxiliary devices in the UAD 218, may be configured to process the images to determine the portion of the bucket not filled with the work aggregate 104. Based on the first input and the second input, the controller 300 may be configured to determine the bucket fill factor as the operational parameter associated with the operation of the machine 102. The bucket fill factor may be understood as a ratio of volume of the work aggregate 104 occupying the bucket, to the capacity of the bucket of the machine 102. Once the controller 300 has determined the operational parameter, the controller 300 is configured to transmit the determined operational parameter to at least one of the machine 102 and the base station 208. On receipt of the operational parameters from the controller 300, the base station 208 may save the operational parameters for further analysis of productivity of the machine 102 at the worksite 100. Similarly, on receipt of the operational parameters, the first processing unit 302 of the machine 102 may store the operational parameters in the memory thereof. Further, a difference in expected value of the operational parameter, such as the bucket fill factor, and the value of determined operational parameter may be indicated to the operator of the machine 102, so that the operator may operate the machine 102 in a manner to reach the expected value of the operational parameter.

In another embodiment, the controller 300 may be configured to transmit the first input and the second input to the first processing unit 302 via the cable 220. On receipt of the first input and the second input, the first processing unit 302 may be configured to determine the multiple operational parameters and thereafter transmit the determined operational parameters to the base station 208 via the UAD 218. In yet another embodiment, the controller 300 may be configured to transmit the first input and the second input to the second processing unit 306 of the base station 208. On receipt of the first input and the second input, the second processing unit 306 may share the first input and the second input with the data processing device 216 and the first, second and third computing systems 210, 212, 214. The data processing device 216 or the first, second and third computing systems 210, 212, 214 may be configured to determine the multiple operational parameters and transmit the determined operational parameters, as a third input, to the UAD 218 and the machine 102. In one example, the operational parameters transmitted by the base station 208 may provide an indication to the operator of the machine 102. Such indication would require the operator of the machine 102 to operate the machine 102 in a manner to achieve the expected value of the operational parameters.

The controller 300 may be further configured to receive the third input from the base station 208. Subsequently, the controller 300 may transmit the third input to the machine 102. In addition to the various functions of the controller 300 described herein, the controller 300 may be further configured to determine presence of at least one of the truck 106 and the work aggregate 104 within the area 236 around the machine 102. Since the controller 300 continuously receives the second input from the image capturing unit 234, the controller 300 may be able to determine presence of any truck, other than the truck 106, in the vicinity of the machine 102. Accordingly, the controller 300 may transmit instructions to the machine 102, specifically to the operator of the machine 102, to operate the machine 102 in such a manner that the implement 206 of the machine 102 does not interfere with the other truck or any vehicle intruding the area 236. In an example, the second inputs received by the controller 300 may be continuously transmitted to the base station 208, where one or more personnel may monitor the intrusion of any vehicle or person into the area 236 or the vicinity of the machine 102 from the video signals or images. Accordingly, the personnel at the base station 208 may indicate to the operator of the machine 102 regarding intrusion of the vehicle or persons into the area 236. For the purpose of providing inputs to the base station 208 for determining the presence of any intruding vehicle or person, the UAD 218 includes at least one of, but limited to, a camera, a light detection and ranging (LIDAR) unit, a forward looking infrared (FLIR) unit, a magnetometer, a global positioning system (GPS), and an inertial measurement unit (IMU).

In another embodiment, the controller 300 may be configured to transmit the determined multiple operational parameters to the mobile device 230 via the second network 232. The operational parameters may be depicted on the mobile device 230, where the operator of the machine 102 can determine the productivity of the machine 102 with the aid of one or more applications employed in the mobile device 230.

INDUSTRIAL APPLICABILITY

The present disclosure relates to the system 202 and a method 400 of gathering data associated with the operation of the machine 102. The controller 300 of the UAD 218 receives the first input from the machine 102 via the cable 220 and second input from the image capturing unit 234, and determines the operational parameters on a real-time basis. Due to the continuous transmission of the first input and the second input by the machine 102 and the image capturing unit 234, respectively, the multiple operational parameters associated with the operation of the machine 102 may be determined on the real-time basis. Based on the multiple operational parameters, productivity of the machine 102 may be ascertained.

Figure 4:
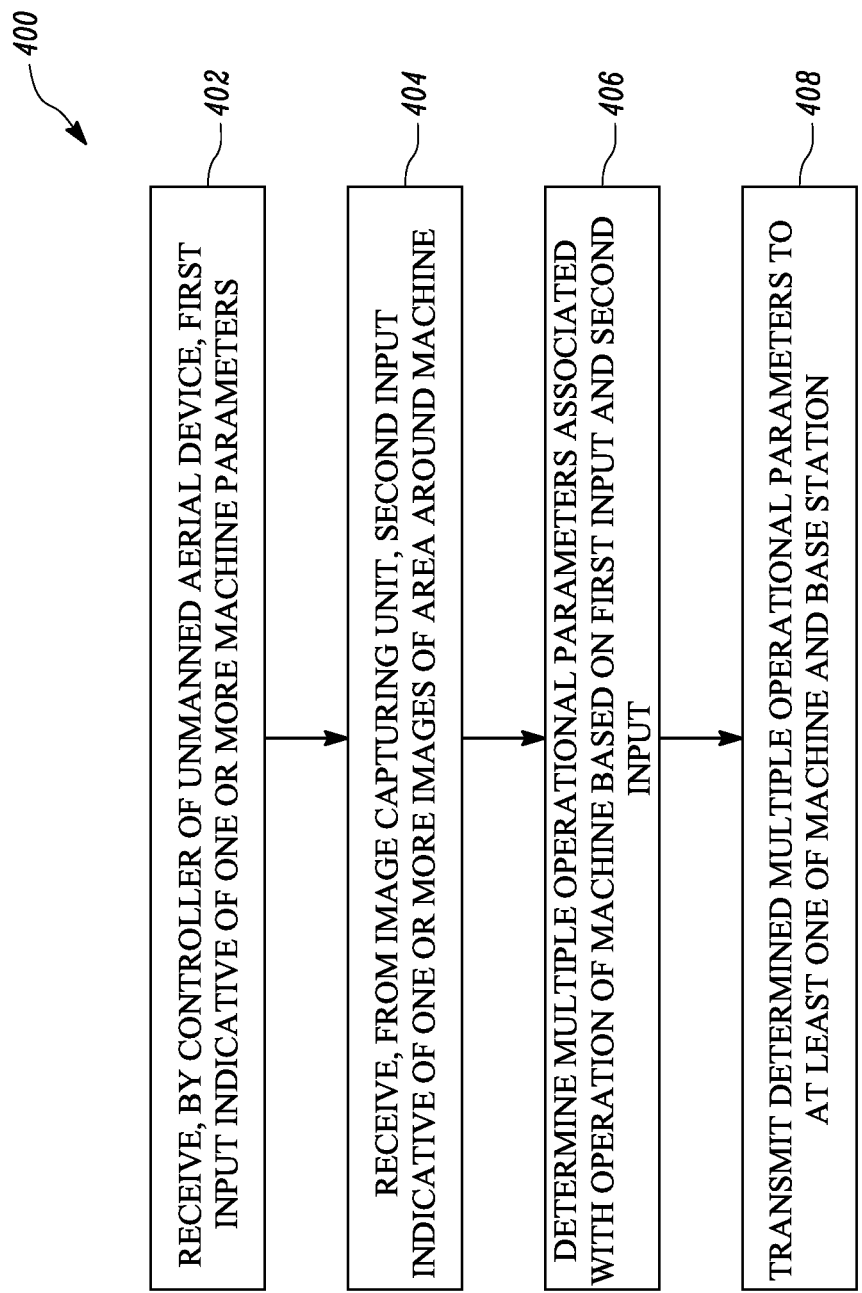
FIG. 4 is a flowchart of a method for gathering data associated with an operation of the machine at the worksite, according to an embodiment of the present disclosure.

FIG. 4 illustrates a flow chart of the method 400 for gathering data associated with the operation of the machine 102, according to an embodiment of the present disclosure. The steps in which the method 400 is described are not intended to be construed as a limitation, and any number of steps can be combined in any order to implement the method 400. Further, the method 400 may be implemented in any suitable hardware, such that the hardware employed can perform the steps of the method 400 readily and on a real-time basis.

For the purpose of illustration, various steps of the method 400 will be described in conjunction with FIGS. 1 to 3 of the present disclosure. Rather, it will be understood by a person skilled in the art that the method 400 may be suitably implemented, albeit with few variations to the method 400 described herein. In one example, the method 400 may be implemented in a hardware module for gathering the data. For instance, the method 400 can include activities performed by the controller 300 for gathering the data.

At step 402, the method 400 includes receiving the first input indicative of one or more machine parameters. In one embodiment, the first input may be received by the controller 300 of the UAD 218. At step 404, the method 400 includes receiving the second input indicative of one or more images of the area 236 around the machine 100. In said embodiment, the image capturing unit 234 may be configured to capture the area 236 around the machine 102 and the controller 300 may be configured to receive the second input from the image capturing unit 234. Further, at step 406, the method 400 includes determining multiple operational parameters associated with the operation of the machine 102, based on the first input and the second input. In said embodiment, the controller 300 may be configured to determine the multiple operational parameters. In one example, the multiple operational parameters may include at least one of the position of the implement 206 of the machine 102 relative to the frame 204 thereof, data regarding loading of the machine 102 and the truck 106, data regarding proximity of the machine 102 to the truck 106, the bucket fill factor, and the work cycle of the machine 102. Furthermore, at step 408, the method 400 includes transmitting the determined multiple operational parameters to at least one of the machine 102 and the base station 208.

Based on the determined multiple operational parameters, in an example, a final bucket-load position may be determined to normalize the center of gravity of the truck 106. Further, with the aid of the image capturing unit 234 of the system 202, a visual indication may be provided to the personnel at the base station 208 and the operator of the machine 102. In addition, owing to the continuous monitoring of the operation of the machine 102, awareness regarding intrusion of any vehicle or person into the area 236 may be immediately provided in form of an indication to the operator of the machine 102, thereby adding to the safety of the operation of the machine 102. Furthermore, as described earlier, the bucket fill factor may be determined based on the first input and the second input. The bucket fill factor provides an opportunity for the personnel at the base station 208 to perform a quantitative analysis of the operation of the machine 102, and thereby ascertain whether the operator of the machine 102 needs training. In addition, the real-time determination of the multiple operational parameters may also assist in truck bunching at the worksite 100.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A data handling system associated with a working machine operating at a worksite, the data gathering system comprising:
   a base station located at the worksite; and
   an unmanned aerial device communicatively coupled to the working machine using a cable, and configured to communicate with the base station, wherein the cable is configured to receive electric power from the working machine to propel the unmanned aerial device, the unmanned aerial device comprising:
      an image capturing unit configured to capture one or more image of an area around and including the working machine; and
      a controller in communication with the image capturing unit, the controller configured to:
         receive a first input from the working machine via the cable, the first input indicative of one or more machine parameters;
         receive a second input from the image capturing unit, the second input indicative of the one or more images of the area around and including the working machine;
         determine multiple operational parameters associated with an operation of the working machine based on the first input and the second input; and
         transmit the determined multiple operational parameters to at least one of the working machine and the base station,
   wherein the unmanned aerial device is configured to be disposed at a height relative to the working machine so the image capturing unit captures one or more images of operation of the working machine corresponding to the one or more machine parameters associated with the first input,
   wherein the one or more machine parameters received from the working machine by the controller identify to the controller the one or more machine parameters of the working machine to capture and analyze using the image capturing unit of the unmanned aerial device,
   wherein the multiple operational parameters comprise at least one of a position of an implement of the working machine relative to a frame thereof, data regarding loading of the working machine, data regarding proximity of the working machine to a truck in the area around and including the working machine, a bucket fill factor associated with the implement of the working machine, and a bucket loading and unloading work cycle of the working machine, and
   wherein the determined multiple operational parameters are transmitted to the working machine via the cable and include instructions to be provided, via the working machine, to an operator of the working machine to operate the working machine to reach a predetermined value of at least one of the determined multiple operational parameters.

2. The data handling system of claim 1,
   wherein the controller is configured to communicate with a first processing unit disposed in the working machine, and
   wherein the first processing unit is in communication with a sensing unit of the working machine, the sensing unit configured to generate a signal indicative of the one or more machine parameters.

3. The data handling system of claim 2, wherein the cable is configured to communicate with the controller of the unmanned aerial device and the first processing unit of the working machine.

4. The data handling system of claim 3,
   wherein the controller is configured to transmit the first input and the second input to the first processing unit via the cable, and
   wherein the first processing unit is configured to determine the multiple operational parameters associated with the working machine based on the first input and the second input.

5. The data handling system of claim 1, wherein the controller is configured to communicate with a second processing unit disposed in the base station, and transmit the first input and the second input to the second processing unit, the controller configured to:
   receive a third input from the base station, the third input indicative of the multiple operational parameters associated with an operation of the working machine, wherein the third input is determined by the second processing unit; and
   transmit the third input to the working machine.

6. The data handling system of claim 1, wherein the controller is configured to determine presence of the truck and a work aggregate within the area around and including the working machine, based on the second input received from the image capturing unit.

7. The data handling system of claim 1, wherein the unmanned aerial device comprises at least one of a camera, a light detection and ranging (LIDAR) unit, a forward looking infrared (FLIR) unit, a magnetometer, a global positioning system (GPS), and an inertial measurement unit (IMU).

8. A method for handling data associated with an operation of a working machine at a worksite, the method comprising:
   receiving, by a controller of an unmanned aerial device, from the working machine via a cable, a first input indicative of one or more machine parameters, wherein the unmanned aerial device is communicatively coupled to the working machine via the cable;
   disposing the unmanned aerial device at a height relative to the working machine so an image capturing unit of the unmanned aerial device captures one or more images of operation of the working machine corresponding to the one or more machine parameters associated with the first input;
   receiving, from the image capturing unit of the unmanned aerial device, a second input indicative of one or more images of an area around and including the working machine;
   determining, by the controller, multiple operational parameters associated with the operation of the working machine based on the first input and the second input;
   transmitting, by the controller, the determined multiple operational parameters to the working machine via the cable and to a base station, wherein the base station is in communication with the unmanned aerial device, the determined multiple operational parameters transmitted to the working machine via the cable including instructions to be provided, via the working machine, to an operator of the working machine to operate the machine to reach a predetermined value of each of the determined multiple operational parameters;

electronically outputting, at the working machine, the instructions to the operator of the working machine to operate the working machine to reach the predetermined value of each of the determined multiple operational parameters;

controlling the working machine based on the transmitted multiple operational parameters;

determining, by the controller, presence of a truck within the area around and including the working machine based on the second input;

electronically receiving, by the working machine from the base station, information regarding the presence of the truck within the area around and including the working machine; and electronically outputting, by the working machine, the information regarding the presence of the truck within the area around and including the working machine, wherein the one or more machine parameters received from the working machine by the controller identify to the controller the one or more machine parameters of the working machine to capture and analyze using the image capturing unit of the unmanned aerial device, and wherein the multiple operational parameters comprise at least one of a position of an implement of the working machine relative to a frame thereof, data regarding loading of the working machine, data regarding proximity of the working machine to the truck in the area around and including the working machine, a bucket fill factor associated with the implement of the working machine, and a bucket loading and unloading work cycle of the working machine.

9. The method of claim 8 further comprising generating, by the controller, a signal indicative of the one or more machine parameters via a sensing unit of the working machine, wherein the sensing unit is in communication with a first processing unit disposed in the working machine.

10. The method of claim 9 further comprising:
transmitting, by the controller, the first input and the second input to the first processing unit via the cable; and
determining, by the first processing unit, the multiple operational parameters associated with the working machine, based on the first input and the second input.

11. The method of claim 8 further comprising:
communicating, by the controller, the first input and the second input to a second processing unit disposed at the base station to determine multiple operational parameters;
receiving, by the controller, the determined multiple operation parameters from the second processing unit; and
transmitting, by the controller, the determined multiple operational parameters to the working machine.

12. A machine capable of operating at a worksite, the machine comprising:
a land vehicle; and
an unmanned aerial device communicatively coupled to the land vehicle,
wherein the land vehicle includes:
a sensing unit configured to generate a signal indicative of one or more machine parameters; and
a first processing unit in communication with the sensing unit, the first processing unit configured to communicatively couple to the unmanned aerial device via a cable, wherein the cable is configured to receive electric power from the land vehicle to propel the unmanned aerial device,
wherein the unmanned aerial device is configured to communicate with a base station located at the worksite and includes:
an image capturing unit configured to capture one or more images of an area around and including the land vehicle; and
a controller in communication with the image capturing unit, the controller configured to:
receive a first input from the land vehicle via the cable, the first input indicative of one or more land vehicle parameters;
receive a second input from the image capturing unit, the second input indicative of the one or more image of the area around and including the land vehicle;
determine multiple operational parameters associated with an operation of the land vehicle based on the first input and the second input;
transmit the determined multiple operational parameters to the land vehicle via the cable and to the base station, the determined multiple operational parameters transmitted to the machine via the cable including instructions to be provided, via the land vehicle, to an operator of the land vehicle to operate the land vehicle to reach a predetermined value of each of the determined multiple operational parameters; and
determine presence of a truck within the area around and including the land vehicle based on the second input;
wherein the first processing unit of the land vehicle is configured to:
control electronic output of, at the land vehicle, the instructions to the operator of the land vehicle to operate the land vehicle to reach the predetermined value of each of the determined multiple operational parameters;
control the land vehicle based on the transmitted multiple operational parameters;
receive, from the base station, information regarding the presence of the truck within the area around and including the land vehicle; and
control electronic output of the information regarding the presence of the truck within the area around and including the land vehicle,
wherein the unmanned aerial device is configured to be disposed at a height relative to the land vehicle so the image capturing unit captures one or more images of operation of the land vehicle corresponding to the one or more machine parameters associated with the first input,
wherein the one or more machine parameters received from the land vehicle by the controller of the unmanned aerial device identify to the controller the one or more machine parameters of the land vehicle to capture and analyze using the image capturing unit of the unmanned aerial device,
wherein the multiple operational parameters comprise at least one of a position of an implement of the land vehicle relative to a frame thereof, data regarding loading of the land vehicle, data regarding proximity of the land vehicle to the truck in the area around and including the land vehicle, a bucket fill factor associated with the implement of the land vehicle, and a bucket loading and unloading work cycle of the land vehicle, and wherein the determined multiple operational parameters are transmitted to the land vehicle via the cable and include instructions to be provided, via the land vehicle, to an operator of the land vehicle to operate the land vehicle to reach a predetermined value of at least one of the determined multiple operational parameters.

13. The machine of claim 12, wherein the controller is configured to transmit the first input and the second input to the first processing unit via the cable, and wherein the first processing unit is configured to determine the multiple operational parameters associated with the land vehicle.

14. The machine of claim 12, wherein the controller is configured to communicate with a second processing unit disposed in the base station, and transmit the first input and the second input to the second processing unit, the controller configured to:

receive a third input from the base station, the third input indicative of the multiple operational parameters associated with an operation of the land vehicle, wherein the third input is determined by the second processing unit; and transmit the third input to the land vehicle.

15. The machine of claim 12, wherein the controller is configured to determine presence of the truck and a work aggregate within the area around and including the land vehicle, based on the second input from the image capturing unit.

16. The machine of claim 12, wherein the unmanned aerial device includes at least one of a camera, a light detection and ranging (LIDAR) unit, a forward looking infrared (FLIR) unit, a magnetometer, a global positioning system (GPS), and an inertial measurement unit (IMU).

* * * * *